United States Patent [19]

Litzburg

[11] Patent Number: 4,528,940

[45] Date of Patent: Jul. 16, 1985

[54] AQUARIUM

[76] Inventor: Frank Litzburg, 511 Martin Rd., Lackawanna, N.Y. 14218

[21] Appl. No.: 629,124

[22] Filed: Jul. 9, 1984

[51] Int. Cl.³ .................................................. A01K 64/00
[52] U.S. Cl. ...................................................... 119/5
[58] Field of Search ............................................. 119/5

[56] References Cited

U.S. PATENT DOCUMENTS

| | | | |
|---|---|---|---|
| 2,016,123 | 10/1935 | Schorr | 119/5 |
| 3,255,731 | 6/1966 | Girard | 119/5 X |
| 3,288,110 | 11/1966 | Goldman et al. | 119/5 |
| 3,929,101 | 12/1975 | Katz | 119/5 |
| 4,004,551 | 1/1977 | Kato | 119/5 |

Primary Examiner—Robert P. Swiatek
Attorney, Agent, or Firm—James J. Ralabate

[57] ABSTRACT

A self-contained aquarium having a three section construction including a main section, a heat control section and filter section. A visible horizontal capillary flow tube extends from the heat control section to the filter section through which water flows. This flow tube is clear plastic or glass and greatly enhances the visual enjoyment of the aquarium.

18 Claims, 4 Drawing Figures

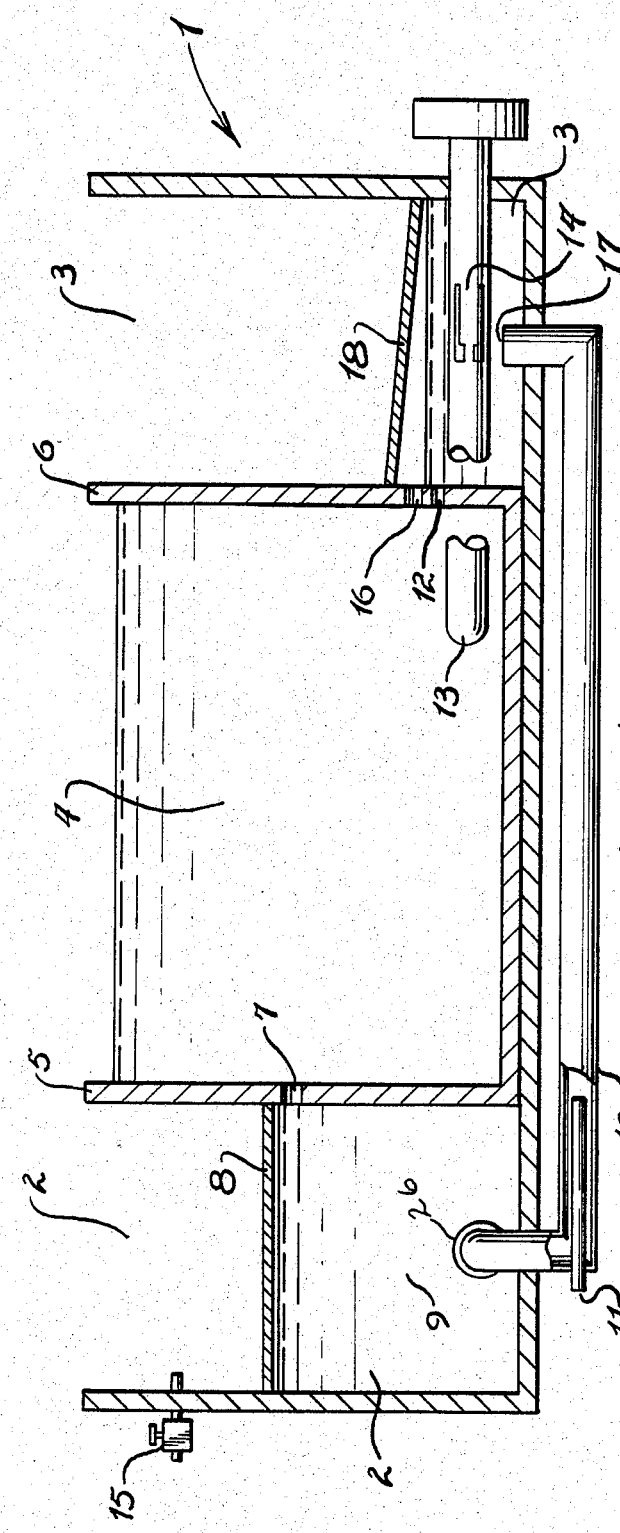
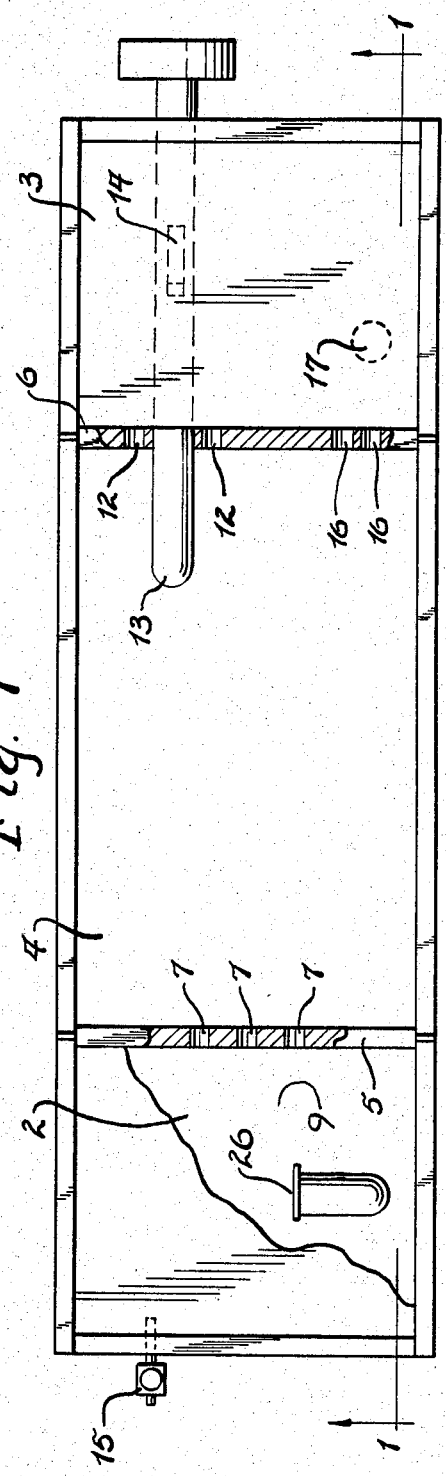

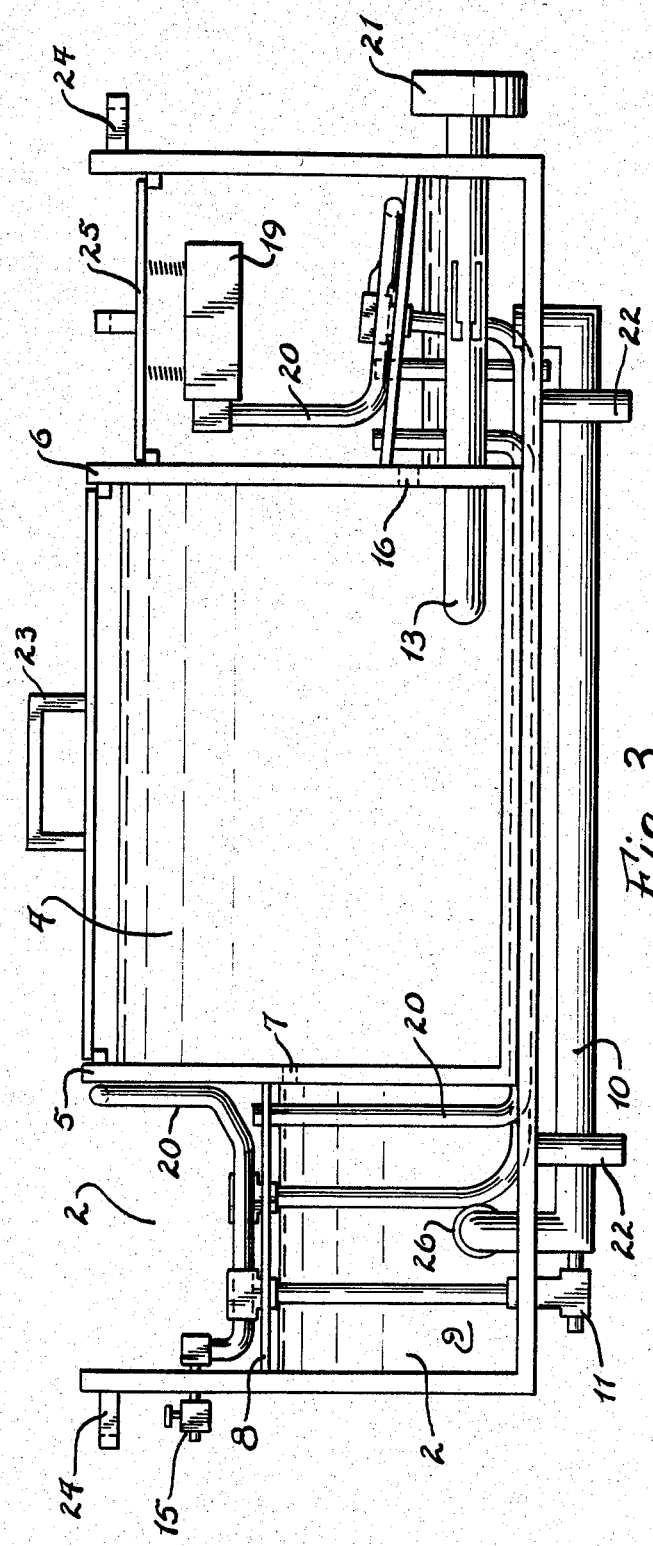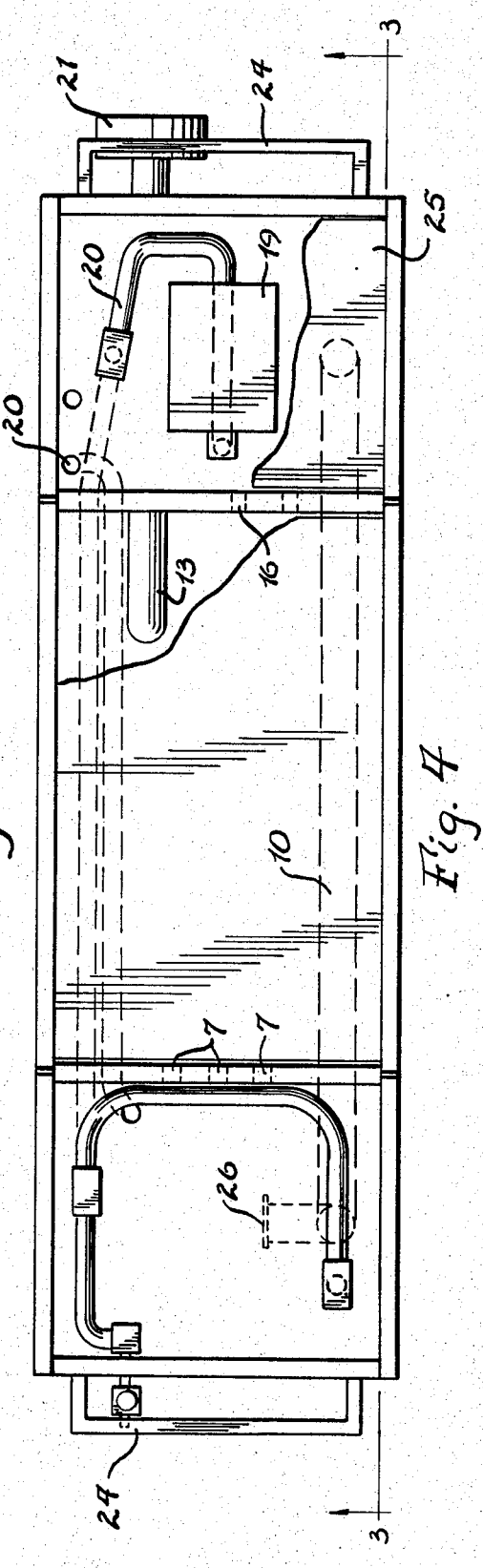

AQUARIUM

This invention relates to aquariums and, more specifically, to a self-contained aquarium system requiring a minimum of upkeep and attention.

BACKGROUND OF THE INVENTION

Self-contained aquarium systems are known and used today, however, many of them are complex to manufacture, expensive and difficult to use. Other known units are difficult to maintain and require a substantially disproportionate amount of care and attention. Many known self-contained aquarium systems are also not only unattractive but are large and cumbersome to transport or move from place to place. Most prior art aquarium systems are two-compartmented structures having a main compartment for supporting aquatic life and a second section or compartment containing a filtration system, air pump and heating system. Because of the several components in this section, most aquariums are higher than necessary or functional and present a rather unattractive appearance. The heating element is generally in a vertical position and is thus accommodated by a high structure to house it. U.S. Pat. No. 4,064,837 discloses a typical construction wherein the aquarium consists of a two-compartment or section structure having the pump, heater and filter all on the same side of the main compartment or section, and wherein a vertically disposed heating system is utilized. The aquarium of this prior art patent comprises a tank with a dividing wall which forms a main compartment and an equipment compartment. In the equipment compartment is located the above-stated filter box, air pump and vertical heating unit. This accumulation of equipment in one compartment or section necessitates an aquarium structure relatively high in relationship to its length.

In addition, other aquariums have been used which require multiple pieces of equipment to function properly. For example, some require two pumps to provide water circulation through the system and a second to provide streams of air bubbles to the bottom portion of the main tank. Not only is this type prior art system complex to use but is also inefficient in terms of the necessary energy required to maintain its operation. These systems, because of their multiple components are complex in manufacture and relatively expensive to manufacture.

Other known aquariums are disclosed in U.S. Pat. Nos. 3,795,225; 3,892,200; 3,908,598; 3,796,858; 3,848,567; 4,078,522; 4,191,129 and 4,206,719.

SUMMARY OF THE INVENTION

It is therefore an object of this invention to provide an aquarium devoid of the above-noted disadvantages.

Another object of this invention is to provide an attractive yet highly function aquarium system.

A further object of this invention is to provide a self-contained aquarium system constructed in a horizontal rather than in a vertical disposed system in order to accommodate equipment and components.

Another further object of this invention is to provide a self-contained aquarium system wherein components and equipment are not visible and thus enhance the attractiveness of the system.

Another still further object of this invention is to provide a heating system for the aquarium that is horizontally disposed which permits a shortened and attractive height for the aquarium.

Still another object is to provide an aquarium that contains a horizontal capillary tube that accommodates filtered water circulation through the system.

Another still further object of this invention is to provide an aquarium with a horizontal flow capillary that greatly increases the viewing appeal of the aquarium.

Still another object of this invention is to provide a system that uses self-venting of air in all compartments when filling with water.

A further object is to provide an aquarium light in weight that is easily moved from place to place and is readily stored.

A yet further object is to provide a self-contained goldfish aquarium that does not require heat.

The foregoing objects and others are accomplished by this invention by providing a self-contained aquarium comprising three compartments or sections. The main section having heating means which supports aquatic life is positioned between two adjacent component sections or compartments. The first component section contains an air pump and heat control means, i.e. a thermostat and the second component section contains filtration means. Each section is in liquid flow connection with the main section via apertures located in the walls dividing the sections or compartments or a loop circulatory system. Extending from the first component section or compartment to the second component section or compartment is a horizontally disposed liquid/air flow capillary tube which is adapted to permit the wave effect of capillary attraction of the flow of water and air therethrough. This air-injected capillary tube permits an air-water wave mix to flow from the filter compartment to the heat control compartment in a visually appealing manner. The filtered water passing through this capillary tube enters the heat control compartment containing the thermostat section of the heater or heater tube, and from there flows into the main section via flow apertures located in the wall dividing the main compartment or section from the heat control compartment. The two component sections or compartments are in liquid flow connection with the main compartment and in capillary tube liquid flow connection with each other which creates a loop circulatory water system. The two component sections have hermetically sealed roofs which limit the level of liquid that can be contained in each compartment. The height of the roof in the heat control compartment is preferably lower than that of the filter compartment in order to permit the proper continuous flow of air and liquid through the horizontal capillary tube connecting each to the other. The air pump is preferably located in the heat control compartment above the roof in said compartment, however, it may be located in any other suitable location, if desired. A continuous tubing extends from the air pump through the other compartments of the aquarium as follows:

The spring suspended air pump in the heat control section supplies air through semi-coiled shock absorbing long plastic tubing at air pump, then is preferably sandwiched inside the bottom wall of the main center tank to the filter section containing the filtration compartment which is substantially filled with filter floss and activated charcoal. This air line tubing continues through the filter section, uninterrupted, through the bottom wall and is inserted into the elbowed end of a larger diameter capillary tube that contains a removable screen for easy cleaning, if necessary. This larger air/water-filled capillary tube extends horizontally across the outside bottom of the main center tank to the heat control section of the aquarium containing the air/water-filled thermostatic compartment.

All of this constitutes an "AIR-PUSH/AIR-LIFT" system. No other system has a capillary attraction phenomena "AIR-PUSH" before the air-lift that circulates and aeriates the water. All air-lifts are in a vertical position in other prior art aquarium designs.

The present invention with its super structural design enables one to condense this self-contained aquarium system down to its smallest possible dimensions. It provides an eye appealing and a balanced appearance. It has carrying handles on both ends for portability. Artificial plant decorations or other suitable materials can be used to deck the two end sections, if desired.

The main center tank containing aquatic life forms can easily be maintained. The reason for this ease of maintenance is due to the fact that the water outlet holes of the main center tank are situated approximately half way up on the left wall. The result of this placement of water inlet holes to the filter compartment is the fact that debris settles to the bottom of the tank where it can be easily syphoned out. The debris does not enter the filter compartment resulting in less frequent changing of the filter material.

A major innovative feature of this invention is the visible, horizontal, crossover, "air-water wave mix" capillary tube leading from the filter section to the heat control section. This visible crossover capillary tube with air-induced capillary attraction waves is visibly attractive while also serving a useful function of system.

The present invention provides an improvement and modification of structural to super structural design and improved visual pleasure over other self-contained aquarium systems.

If desirable, deleting the heater transforms this self-contained tropical aquarium into a self-contained goldfish aquarium which does not require heat. This removal of heater results in a self-contained goldfish aquarium with no obstructions on all sides. The main tank becomes an empty tank such as a plain goldfish bowl made of glass.

A plain glass goldfish bowl requires constant changing of water every few days. Constant removal of goldfish may result in injury with possible fatal consequences. With the present heaterless system there is no need to constantly change the water only about 20% periodically. There is also no need to remove the goldfish from the bowl. Cleaning the debris on the bottom by syphoning is all that will be required for many months until filter material needs renewing.

As the air pump is still enclosed in the body, the size of the whole unit remains the same, requiring artificial decorations on the top decks of both sides of the whole aquarium.

By removing the air pump from its internal placement and positioning it in a fabricated base, pump concealed of course, upon which the whole goldfish system will set on, will result in fabricating a smaller goldfish bowl which could be reduced in length, width and height. It would become practically a "windowsill" fishbowl.

With the elimination of the heater and air pump from the body of the goldfish bowl, both the heat control section and filter section upper compartments will become empty.

As the filtration and aeration system still remains intact in the filter and heat control sections, natural plant life can be placed in both upper compartments. Some examples are live cacti or seeds of plant life for children to observe in growing stages.

In regards to tropical fish systems, a thermometer indicating water temperature is a requirement. In most conventional systems this thermometer is either placed inside the main tank or on the outside viewing surface. This prior art method obstructs the view of the aquatic life. Over a period of testing time, with three identical "stick-on" thermometers, the circulating water of this invention remains at the same temperature in all three compartments. Therefore, by placing one "stick-on" thermometer on the front, outside wall of the filter compartment, it results in an unobstructed view of the main center tank.

In most self-contained aquarium systems, there are only two sections. One section being the main aquatic life form tank and the other section being an equipment compartment. This conventional, two-section system can only accomplish partial circulation of heated water. The heated water-air mix is ejected from the top of the single dividing wall. The heated water remains near the surface while the cooler water is drawn in near the bottom of the same wall.

The present invention and system performs in reverse order. Circulating water-air mix is ejected from a low elevation on one dividing wall and is drawn in at a higher elevation on the other dividing wall.

In conventional systems the air-water mix is ejected from one outlet in a vertical "air-lift" tube.

In the present system, a two-outlet system is created. The horizontal "air-push/air-lift" capillary tube finalizes in a single watertight compartment. A slight pressurization of the compartment occurs from the entry of the forced air supply and water. The air rises immediately, going out two outlet holes near the top of the compartment while the water has to cross the compartment and go past the heater thermostat. The water then goes out of the compartment at a lower elevation through two outlet holes into the main tank for recirculation.

In most self-contained aquarium systems the air bubble stream entering the main tank is hidden from view as much as possible at the rear wall.

In the present system, the air bubble stream is situated in the front, righthand corner. The cover for the main center tank has a baffle plate situated directly over the outlet holes of the air stream. This baffle plate serves two purposes. It creates a still water surface while also functioning as a playground for the fish who like to frolic under it as well as frolicking up and down in the air stream. This air placement up front gives added visual enjoyment.

As noted earlier, omitting the heater, while retaining the filtration system and aerating system, the structure becomes a self-contained goldfish aquarium system of the same dimensions in size and volume of water. It will become more economical and saleable to the beginning fish fancier.

By removal of the air pump which has governed the size of the foregoing descriptions of the present system, the goldfish system can be miniaturized still further. It becomes a goldfish bowl of any desirable size with its own aerating and filtration systems being supplied with air from an external source.

Any suitable air pump may be used with the aquarium of this invention. An air pump that is preferred is "Whisper 200 Aquarium Air Pump" which is a registered trademark of Willinger Bros. Inc., Consumer Service, 511 Main Street, Fort Lee, N.J. 07024.

Any suitable heat and heat control system may be used with the aquarium of this invention. A preferred heater is the "Longlife 25 Watt Aquarium Heater" which is a registered trademark of Hartz Mountain Corp., Harrison, N.J. 07029.

Any suitable filtering material may be used with the aquarium of this invention. A preferred material is filter floss and charcoal tightly packed in compartment 2 described below.

The invention will be further described in reference to the accompanying drawings.

BRIEF DESCRIPTION OF THE DRAWING

FIG. 1 is a front view of the aquarium and preferred embodiment of the invention.

FIG. 2 is a top view of the aquarium and preferred embodiment of the invention.

FIG. 3 is a front view of the aquarium with the major components or equipment shown.

FIG. 4 is a top view of the aquarium with the major components or equipment shown.

DESCRIPTION OF THE DRAWING AND OF THE PREFERRED EMBODIMENTS

In FIG. 1 the aquarium of this invention is shown in its basic structure without all of the equipment contained in the equipment compartments 2 and 3 and the cover or top structure. Main compartment 4 supports aquatic life and is positioned between filter compartment 2 and heat control compartment 3. The self-contained aquarium 1 is formed of any suitable material such as opaque or clear plastic or glass; clear acrylates are suitable yet durable materials to use. However, any material that is substantially non-toxic and clear can be used. Walls 5 and 6 separate main compartment 4 from filter compartment 2 and heat control compartment 3. In wall 5 are positioned water outlet apertures 7 that allow heated water to flow from main compartment 4 into filter compartment 2. Filter compartment 2 has a roof 8 which restricts the level of water or liquid that can be contained therein. Water outlet apertures 7 are located just below roof 8 and permit substantial filling of filter compartment 2. Roof 8 is made of a clear plastic material to observe visually the condition of the filter bed 9. Heated water which passes into compartment 2 via apertures 7, then flows into filter compartment 9 where it is filtered of debris and then passes into visible horizontal capillary tube 10 which has a removable screen 26 over the inlet. Here the water flows through tube 10 in a water-air mixture which is formed when air from air inlet means 11 mixes with the filtered water which flows from filter bed 9 into screen 26 at inlet of tube 10. This tube 10 is clear plastic or glass and greatly enhances the visual enjoyment of the present invention. In addition to being visually appealing (with capillary attraction phenomena produced waves) tube 10 is also highly functional in that it permits the flow of filtered, heated water therethrough and assists in its circulation through the system. The air that passes through capillary tube 10 exits through tube exit 17, rises through the water in heat control compartment 3 and is vented out air outlet apertures 16 and bubbled through the water in main compartment 4 to the atmosphere. The filtered water passing through vertical tube exit 17 flows into compartment 3 activates thermostat 14 and then through water outlet apertures 12 into main compartment 4 where it is heated and eventually recirculated through apertures 7 back into filter compartment 2. The heating element 13 is positioned in main compartment 4 and is in heat control contact with thermostat 14 element of heater which is located in heat control compartment 3. The thermostat may be set at any convenient temperature depending upon the type of aquatic life to be housed in main compartment 4. Tube 10 is purged of air thus resulting in tube 10 being filled only with water. By adjusting air release valve 15, very slowly, towards a closing position until a minute stream of air is introduced by inlet 11 into tube 10, an air pocket is formed above the level of water in tube 10 for its entire length. When this long air pocket reaches the elbow of outlet 17 a disturbance called water hammer occurs expelling air and water simultaneously into compartment 3 of the heat control section. At this precise moment the long air pocket above the water level in tube 10 immediately breaks up into globules of air while the water breaks up into capillary attraction waves. From then on as the forced air from inlet 11 enters tube 10 a chain reaction is set up as globules of air are continuously pushed across the entire length of tube 10, until this series of air/water mix waves reaches outlet 17 where water hammer occurs. A definition of "water hammer" can be found in *Funk & Wagnalls Standard Home Reference Dictionary*, 1954 Edition.

Filter bed 9 in chamber 2 is completely packed with floss and charcoal thus chamber 2 creates a slight resistance or back pressure. This enables the air globules to push the water waves toward the path of least resistance which is chamber 3, while drawing water from chamber 2 through screen 26. This replaces the water that is being "hammered" (air-lifted) into chamber 3 from outlet 17. Any suitable heater 13 may be used such as the commercially available model described earlier in this disclosure. Also, any suitable commercially available filter material such as filter floss and charcoal may be used in the aquarium 1 of this invention. By opening valve 15, the speed of air/water flow across tube 10 is decreased. By closing valve 15 very slowly, any desirable speed of flow is obtained. With a fully closed valve 15, a very fast flow is obtained. An air valve 15 is positioned between the atmosphere and compartment 2 to regulate the pressure in the internal portion of aquarium 1. Roof 18 which is clear plastic to visually observe 3 internally is positioned in compartment 3 and limits the level of water or other liquid that is permitted to be contained in that compartment. The roof 18 is slightly inclined in order to permit air which exits through tube exit 17 to pass above the water level in chamber 3 and exit out apertures 16 into the main compartment 4. Also, it is preferred for proper circulation that roof 18 be at a lower level than roof 8 in filter compartment 2. There are two forces of energy. First, the weight of water being more than the weight of air tends to make tube 10 a water equalizer between compartments 2 and 3. Second, air which is liberated from pressurized air tube inlet 11 tends to form an air globule. Each air globule acts like a hammer blow to each capillary action of the water which creates the "wave effect". Circulation of water in this invention is created by a series of hammer blows of air. The water freely circulates through the system of the present invention by capillary phenomena more fully described in "Plumber's and Steamfitters Guides 1 and 2" by Audels, 1946 Edition.

In FIG. 2 the top view of aquarium 1 is illustrated. Apertures 7 can be seen in wall 5 which permits water to flow from main compartment 4 to compartment 2. In FIG. 1 heat control compartment 3, thermostatic portion 14 of heater tube and tube exit 17 can clearly be seen. In wall 6 are located water outlet apertures 12 and air outlet apertures 16. When the air-water mixture leaves the visible tube 10 from vertical exit 17 the air leaves compartment 3 through air exit apertures 16 and the water leaves compartment 3 through water outlet apertures 12. Air regulating valve 15 controls speed of air/water flow through tube 10 by closing (fast flow) or opening (slow flow). Closing air regulating valve 15 increases the pressure in tube 20 and opening it decreases the pressure in tube 20.

In FIGS. 3 and 4 the aquarium 1 of this invention is illustrated fully equipped with air pump 19 and tubing 20. Tubing 20 is one continuous length of plastic tubing fitted with tees and elbows for easy replacement of sections of air tubing 20 extending from the heat control compartment 3 through filter compartment 2 to air inlet 11. Tubing 20 is connected to air pump 19 and provides forced air to inlet 11 of tube 10 and air release valve 15 to atmosphere. The heater control adjusting means 21 of heater is shown external of the aquarium 1 which allows convenient regulation of the internal temperature of aquarium 1. Legs or feet 22 with rubber edging on bottom further reduces any vibration left over from spring suspended air pump 19 and the front paneling extends down past tube 10. A handle 23 is located on the upper surface of cover of aquarium 1. Side handles 24 may be positioned on each side of the aquarium for ease of handling. Air pump mounting plate 25 supports pump 19 that is spring suspended to greatly reduce vibration being transmitted to body of aquarium and also provides stable separation between compartment 3 and main compartment 4. A screen 26 is illustrated over tube 10 inlet for extra separation of debris. Air inlet 11 is shown as it extends into tube 10 and accommodates the entrance of air from the air pump 19 through plastic tube 20 to inlet 11.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A self-contained aquarium comprising a three-section construction, the main section positioned between two adjacent sections, the first adjacent section containing heat control means, and also containing one terminal outlet end of a visible horizontal capillary flow tube, the second of said adjacent sections containing filter means and the terminal inlet end of said horizontal tube, said horizontal tube visibly extending from said first section to said second section and adapted to accommodate water-air flow from one of said sections to the other, said heat control means are in functional connection with a heater, said heater located in said main section, said main section in water flow connection with each of said first and second sections, each of said first and second sections having an upper roof portion which restricts the level of water permitted to occupy each section.

2. The aquarium of claim 1 having means for inducing circulation of liquid throughout said system.

3. The aquarium of claim 1 having flow means between each of said sections.

4. The aquarium of claim 1 having liquid flow apertures between said main section and said adjacent sections.

5. The aquarium of claim 1 having an air pump in one of said sections.

6. The aquarium of claim 1 having an air pump in the section containing said heat control means.

7. The aquarium of claim 1 wherein the roof in said section containing said heat control means is at a level lower than the roof in said section containing said filter means.

8. The aquarium of claim 1 wherein the roof in said heat control containing section is inclined in a downward direction as it approaches the outer wall portion of said aquarium.

9. The aquarium of claim 1 wherein said first adjacent section has both air and water exit apertures in the wall separating said section from said main section.

10. A self-contained aquarium system comprising a three-section construction, the main section positioned between two adjacent sections, the first adjacent section containing a thermostat portion of a heater and also containing one terminal vertical outlet end of a visible horizontal capillary flow tube, the second of said adjacent sections containing filter means and a screened terminal vertical inlet end of said visible horizontal capillary tube, said horizontal capillary tube visibly extending from said first section to said second section and adapted to accommodate water/air flow from one of said sections to the other, said heat control means are in functional connection with a heater, said heater located in said main section, said main section in water flow connection with each of said first and second sections, each of said first and second sections having an upper roof portion which restricts the level of water permitted to occupy each section.

11. The aquarium of claim 10 having means for inducing circulation of liquid throughout said system.

12. The aquarium of claim 10 having flow means between each of said sections.

13. The aquarium of claim 10 having liquid flow apertures between said main section and said adjacent sections.

14. The aquarium of claim 10 having an air pump in one of said sections.

15. The aquarium of claim 10 having an air pump in the section containing said heat control means.

16. The aquarium of claim 10 wherein the roof in said section containing said heat control means is at a level lower than the roof in said section containing said filter means.

17. The aquarium of claim 10 wherein the roof in said heat control containing section is inclined in an downward direction as it approaches the outer wall portion of said aquarium.

18. The aquarium of claim 10 wherein said heat control section has both air and water exit apertures in the wall separating said section from said main section.

* * * * *